United States Patent Office 3,046,293
Patented July 24, 1962

3,046,293
AMMONIA CATALYZED PROCESS FOR PRODUCING HYDROXYSILICON COMPOUNDS
Ronald M. Pike, Chelmsford, Mass., assignor to Union Carbide Corporation, a corporation of New York
No Drawing. Filed Dec. 30, 1959, Ser. No. 862,750
8 Claims. (Cl. 260—448.2)

This invention relates to a process for producing organosilicon compounds.

Hydroxyl end-blocked diorganosiloxanes that are represented by the formula:

$$\mathrm{HO(SiO)}_a\mathrm{H} \quad \text{R} \quad \text{R} \tag{1}$$

wherein R is an unsubstituted or substituted monovalent hydrocarbon group and $a$ has a value of at least 2, have been found to be useful in producing silicone oils which are employed as hydraulic fluids and silicone gums which are employed in producing elastomers. However the processes suggested to date for producing hydroxyl end-blocked diorganosiloxanes have not been entirely satisfactory.

One known process for producing hydroxyl end-blocked diorganosiloxanes involves reacting a diorganopolysiloxane and steam. However this known process suffers from the disadvantage that temperatures as high as 400° C. are required. Such temperatures can cause undesirable side reactions and the need to maintain such temperatures in the reaction zone lessens the commercial attractiveness of the process.

Another known processes for producing hydroxyl end-blocked diorganosiloxanes involves reacting a diorganopolysiloxane and water in the presence of a nitrile and a basic catalyst (e.g. a quaternary ammonium or alkali metal hydroxide or silanolate). The desirability of this known process is limited since nitriles are toxic substances and so constitute a hazard for operating personnel.

It is an object of this invention to provide a process for producing hydroxyl end-blocked diorganosiloxanes which is operable at moderate temperatures and which does not require the use of toxic nitriles.

This invention provides a process for producing hydroxyl end-blocked diorganosiloxanes which involves reacting a completely condensed diorganopolysiloxane and water in the presence of ammonia as a catalyst at a temperature up to 150° C. and at a pressure above atmospheric pressure in a closed vessel.

The diorganopolysiloxanes employed in this invention as starting materials are composed predominantly of groups represented by the formula:

$$-\mathrm{SiO}- \quad \text{R} \quad \text{R} \tag{2}$$

wherein R has the above-defined meaning. These compounds are completely condensed. That is, they are essentially free of silicon-bonded hydroxyl groups (i.e. they contain less than one silicon-bonded hydroxyl group per 250 silicon atoms).

Illustrative of the unsubstituted monovalent hydrocarbon groups represented by R in Formulae 1 and 2 are the alkyl groups (e.g. the methyl, ethyl and octadecyl groups), the cycloalkyl groups (e.g. the cyclohexyl and the cyclopentyl groups), the aryl groups (e.g. the phenyl, tolyl, xenyl and naphthyl groups), the aralkyl groups (e.g. the benzyl and beta-phenylethyl groups), the alkenyl groups (e.g. the vinyl, allyl and hexenyl groups), and the cycloalkenyl groups (e.g. the cyclohexenyl groups). Illustrative of the substituted monovalent hydrocarbon groups represented by R in Formulae 1 and 2 are the alkyl, cycloalkyl, aryl, aralkyl, alkenyl and cycloalkenyl groups containing as substituents one or more amino, cyano, hydroxyl, alkoxy, or aryloxy groups. When the diorganopolysiloxane contains cyano groups as substituents, some hydrolysis of the cyano groups to form —COONH$_4$ groups can occur during the process of this invention. The groups represented by R in Formulae 1 and 2 preferably contain from 1 to 10 carbon atoms inclusive.

The diorganopolysiloxanes represented by Formula 2 include linear polymers containing alkoxy groups (e.g. methoxy, ethoxy or propoxy) or trihydrocarbonsiloxy groups (e.g. trimethylsiloxy) groups as end-blocking or chain terminating groups. These diorganopolysiloxanes also include cyclic polymers such as diorganosiloxane cyclic trimers, tetramers and pentamers. Owing to the presence of small amounts of monofunctional siloxane groups (e.g. trimethylsiloxy groups) or trifunctional siloxane groups (e.g. methylsiloxy groups), these diorganopolysiloxanes can contain an organic group to silicon atom ratio from 1.8:1 to 2.1. Preferably the organic group to silicon atom ratio is from 1.95 to 2.05.

One class of diorganopolysiloxanes that are useful in this invention as starting materials are end-blocked linear diorganopolysiloxane oils which are represented by the formulae:

$$\mathrm{R'O(SiO)}_b\mathrm{R'} \quad \text{Me} \quad \text{Me} \tag{3}$$

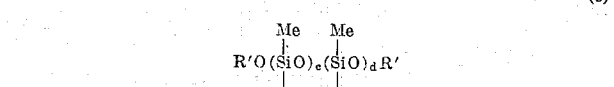

$$\mathrm{R'O(SiO)}_c(\mathrm{SiO})_d\mathrm{R'} \quad \text{Me} \quad (\mathrm{CH}_2)_e\mathrm{NH}_2 \tag{4}$$

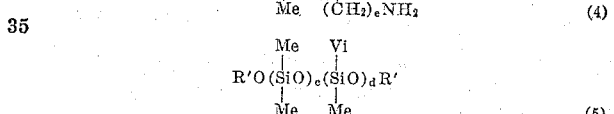

$$\mathrm{R'O(SiO)}_c(\mathrm{SiO})_d\mathrm{R'} \quad \text{Me} \quad \text{Vi} \quad \text{Me} \quad \text{Me} \tag{5}$$

wherein R' is an alkyl group, preferably an ethyl group, or a trimethylsilyl group, $b$ has a value of at least seven and preferably has a value from 2000 to 4000, $c$ and $d$ each have a value of at least one, the sum of $c$ and $d$ has a value of at least seven and preferably has a value from 200 to 4000, and $e$ has a value of at least 3 and preferably has a value from 3 to 5. As used herein the symbol "Me" denotes the methyl group and the symbol "Vi" denotes the vinyl group.

A second class of diorganopolysiloxanes that are useful in this invention as starting materials are dimethylpolysiloxane gums which are represented by the formula:

$$(-\mathrm{SiO})_f \quad \text{Me} \quad \text{Me} \tag{6}$$

wherein $f$ has a value from 6000 to 15,000.

A third class of diorganopolysiloxanes that are useful in this invention as starting materials are cyclic diorganosiloxanes which are represented by the formulae:

$$(\mathrm{SiO})_g \quad \text{Me} \quad \text{Me} \tag{7}$$

$$(\mathrm{SiO})_g \quad \text{Me} \quad (\mathrm{CH}_2)_e\mathrm{NH}_2 \tag{8}$$

wherein $g$ has a value from 3 to 7 inclusive and preferably 3 or 4 and $e$ has a value of at least 3 and preferably has a value from 3 to 5 inclusive.

The diorganopolysiloxanes used in this invention as starting materials are known compounds and can be produced from available materials by known processes. By way of illustration, suitable diorganopolysiloxanes can be produced from diorganodialkoxysilanes by hydrolysis and condensation procedures or from other diorganosiloxanes by equilibration procedures.

The amount of ammonia employed as a catalyst in this invention is not narrowly critical. Amounts of ammonia of from 0.5 to 50 moles per mole of the diorganopolysiloxane are useful but amounts of ammonia of from 2 to 5 moles per mole of the diorganopolysiloxane are preferred. Similarly amounts of ammonia of from 0.25 to 20 moles per mole of water are useful but amounts of ammonia from 2 to 5 moles per mole of water are preferred. It is recognized that the ammonia and water employed in this invention can react to produce ammonium hydroxide. However, even if such reactions occur, ammonia is still available to catalyze the reaction of the diorganopolysiloxane and water since the following equilibrium exists:

$$NH_4OH \rightleftarrows NH_3 + H_2O \qquad (9)$$

The ammonia can be added to the reaction mixture initially in any suitable form (e.g. as liquid or gaseous ammonia or as ammonium hydroxide).

In the process of this invention the starting diorganopolysiloxane and water react according to the skeletal equation:

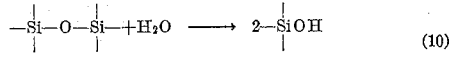

$$(10)$$

Amounts of water from 0.5 to 50 times the stoichiometric amounts required to react with the diorganopolysiloxane according to Equation 10 are useful but amounts of water from 1 to 10 times the stoichiometric amount required to react with the diorganopolysiloxane are preferred.

The amount of ammonia, water and the diorganopolysiloxane employed in this invention is not narrowly critical. Hence, other than the above-indicated amounts can be employed although no commensurate advantage is gained thereby.

An important advantage of the process of this invention is that it can be conducted in the absence of a solvent. However, if desired, a suitable solvent e.g. (1,2-dimethoxy ethylene, $MeOCH_2CH_2OMe$) can be employed.

The ammonia employed in the process of this invention catalyzes the reaction represented by Equation 10 and this catalytic effect of ammonia is surprising in view of the fact that equivalent results are not obtained when other basic compounds are employed in lieu of ammonia. By way of illustration, it is known that quaternary ammonium hydroxide or potassium hydroxide must be employed together with toxic nitriles in order to catalyze the reaction represented by Equation 10. As a further illustration, potassium hydroxide, in the absence of a nitrile, catalyzes condensation reactions which are the reverse of the reaction represented by Equation 10.

The pressure employed in this invention are superatmospheric (e.g. from 400 to 1000 pounds per square inch gage pressure). Preferably the pressure employed is the autogenous pressure that results when the starting materials are heated at the reaction temperature within a closed pressure vessel or autoclave. Under the latter condition pressures of at least 400 pounds per square inch gage are usually generated. Suitable pressure vessels or autoclaves include those that are used in conventional high pressure processes. External pressure can be applied, if desired. Temperatures up to 150° C. are employed in the process of this invention. Temperatures from 100° C. to 150° C. are preferred. At these temperatures the operating difficulties (e.g. corrosion of the reaction vessel and side reactions) encountered in higher temperature processes (e.g. those that require temperatures up to 400° C.) are considerably reduced. The process can be conducted for from 0.5 to 24 hours but preferably is conducted for from 5 to 10 hours.

Any alkoxy groups in the starting diorganopolysiloxane may be converted to alcohols or may remain attached to silicon. These alcohols and alkoxysilicon compounds can be separated from the desired diorganosiloxanes by any suitable means (e.g. by fractional distillation at reduced pressure). Any trihydrocarbonsiloxy or hydrocarbonsiloxy groups in the starting diorganopolysiloxane are present at the completion of the process in compounds (e.g. hexahydrocarbon disiloxanes or hydrocarbonpolysiloxanes) which can be separated from the desired diorganosiloxanes by any suitable means (e.g. by fractional distillation at reduced pressure).

The hydroxyl end-blocked diorganopolysiloxanes produced in accordance with this invention are compounds represented by the formula:

$$(11)$$

wherein R is an unsubstituted or a substituted monovalent hydrocarbon group as defined above for Formula 1 and $h$ has a value from 2 to 250 inclusive or higher.

Among the classes of hydroxyl end-blocked diorganosiloxanes produced in accordance with this invention are those represented by the formulae:

$$(12)$$

$$(13)$$

$$(14)$$

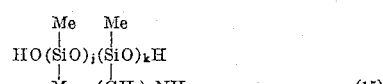

$$(15)$$

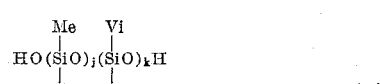

$$(16)$$

wherein $h$ and $e$ have the above-defined meanings and the sum of $j$ and $k$ has a value from 2 to 250 inclusive. These diorganosiloxanes are produced by employing as starting materials those of the above-described completely condensed diorganopolysiloxanes that contain the same organo groups as these diorganosiloxanes. In Formulae 15 and 16 $j$ and $k$ each have a value of at least one.

The number of diorganosiloxy groups in the desired products (i.e. the value of $h$ in Formula 11) can be regulated to some extent by controlling the rate at which the hydroxyl end-blocked diorganosiloxane is cooled to room temperature after it has been formed by the process of the invention. Slow cooling of the hydroxyl end-blocked diorganosiloxane to room temperature (i.e. 25° C.) results in values of $h$ from over 15 and up to 250. Rapid cooling of the hydroxyl end-blocked diorganosiloxanes to room temperature results in values of $h$ from 2 to 15 inclusive. This rapid cooling should be accomplished in at most 15 minutes and preferably in less than 5 minutes. Any convenient means can be used to cool the hydroxyl end-blocked diorganosiloxanes rapidly. By way of illustration the reaction vessel can be equipped with cooling coils or with a cooling jacket.

In general, the value of $h$ in Formula 11 can also be decreased by one or more of the following methods: (1) by conducting the process of this invention at temperatures at or near 150° C. rather than at lower temperatures; (2) by conducting the process at the lower ammonia to water ratio within the above-mentioned ranges, (3) by conducting the process at the higher water to diorganopolysiloxane ratios within the above-mentioned ranges, and (4) by conducting the process for the shorter times within the above-mentioned ranges.

At the completion of the process of this invention the ammonia, any excess water, any solvent and any unreacted starting siloxane can be separated from the hydroxyl end-blocked diorganosiloxane by any conventional means (e.g. by heating the reaction mixture at sub-atmospheric pressure to volatilize the ammonia, water and solvent).

The hydroxyl end-blocked diorganosiloxanes produced in accordance with the process of this invention are useful per se as hydraulic fluids. These siloxanes can also be converted by known procedures to silicone gums and, ultimately, to silicone elastomers.

The following examples illustrate the present invention:

Example I

To a 300-cc. stainless steel bomb were charged 59.2 grams (0.2 mole) of $(Me_2SiO)_4$, and 36 grams (0.2 mole) of water. The bomb was externally cooled by immersing the bomb in a mixture of solid carbon dioxide and acetone. Liquid ammonia 83 cc. (4.0 mole) was added to the bomb. The bomb was sealed, warmed to room temperature, placed in a rocking furnace and the contents were heated to 150° C. The pressure was 850 p.s.i.g. (pounds per square inch gage). After 1 hr. at 150° C. the vessel was allowed to cool slowly to room temperature in the furnace and its contents were discharged. An oil (56.09 grams) separated from the reaction liquor and was filtered. The oil was then vacuum stripped by heating to 100° C. at 2 mm. of Hg pressure to give 45.6 g. of clear, colorless oil [$n_D^{25}$ 1.4040, viscosity 34 centipoises at 20° C., 2.6 wt.-percent hydroxyl groups] having the average formula:

$$HO(Me_2SiO)_{17.5}H$$

A small amount of $HOSiMe_2OSiMe_2OH$ was produced as a distillate during the stripping operation.

Example II

Following the general procedure used in Example I, six runs were made to produce hydroxyl end-blocked diorganosiloxanes having the formula $HO(Me_2SiO)_hH$ from octamethylcyclotetrasiloxane $(Me_2SiO)_4$.

| Run | Starting Materials | | Conditions | | |
|---|---|---|---|---|---|
| | $NH_3$ | $H_2O$ | Time (hours) | Temp. (° C) | Press. (p.s.i.g.) |
| 1 | 20 | 1 | 7 | 125 | 880 |
| 2 | 20 | 10 | 7 | 125 | 680 |
| 3 | 20 | 10 | 1 | 125 | 585 |
| 4 | 20 | 10 | 20 | 125 | 700 |
| 5 | 20 | 10 | 7 | 100 | 470 |
| 6 | 20 | 10 | 1 | 150 | 850 |

Moles per mole of $(Me_2SiO)_4$.

| Run | PRODUCT | | | |
|---|---|---|---|---|
| | Viscosity[1] | Refractive index ($n_D^{25}$) | Value of h in HO $(Me_2SiO)_hH)$ | Wt. percent Hydroxyl Groups |
| 1 | 354 | 1.4040 | 128 | 0.36 |
| 2 | 42 | 1.4036 | 22.8 | 2.0 |
| 3 | 50 | 1.4055 | 14.2 | 3.2 |
| 4 | 73 | 1.4036 | 38.2 | 1.2 |
| 5 | 139 | 1.4043 | 91.8 | 0.5 |
| 6 | 34 | 1.4040 | 17.5 | 2.6 |

[1] Centiposes at 20° C.

Example III

In accordance with the above-described process, the indicated diorganosiloxane products can be produced from the indicated starting diorganopolysiloxanes.

| Starting Siloxanes | Products |
|---|---|
| 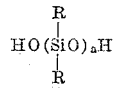 Me<br>\|<br>$(SiO)_g$<br>\|<br>$(CH_3)_mCN$ | Me<br>\|<br>$HO(SiO)_hH$<br>\|<br>$(CH_2)_mCN$ |
| wherein g has a value of 3 to 5 and m has a value of at least 2. | wherein h has a value from 5 to 250 inclusive. |
| Vi<br>\|<br>$(SiO)_g$<br>\|<br>Me | Vi<br>\|<br>$HO(SiO)_hH$<br>\|<br>Me |
| wherein g has a value of 3 to 5. | wherein b has a value from 5 to 250 inclusive. |

The desired products of the process of this invention can be designated as hydroxyl end-blocked diorganosiloxanes or, alternately, as diorganosiloxane diols.

The products of this invention are generally mixtures of compounds which can be represented by Formula 11 wherein h has an averaged value.

What is claimed is:

1. A process for producing diorganosiloxanes represented by the formula:

$$HO(\underset{R}{\overset{R}{Si}}O)_aH$$

wherein R is a member selected from the group consisting of the unsubstituted monovalent hydrocarbon groups and the substituted monovalent hydrocarbon groups containing at least one substituent selected from the group consisting of the amino, cyano, hydroxyl, alkoxy and aryloxy groups and a has a value of at least 2, which process comprises reacting (1) a cyclic diorganopolysiloxane having the formula:

$$(R_2SiO)_g$$

wherein R has the above-defined meaning and g has a value from 3 to 7 inclusive and (2) water in the presence of ammonia at a temperature from 100° C. to 150° C. and at a pressure above atmospheric pressure in a closed vessel, said process being conducted in the absence of any nitrile solvent.

2. The process of claim 1 wherein each R is a methyl group.

3. A process for producing diorganosiloxanes represented by the formula:

$$HO(\underset{R}{\overset{R}{Si}}O)_aH$$

wherein R is a member selected from the group consisting of the unsubstituted monovalent hydrocarbon groups and the substituted monovalent hydrocarbon groups containing at least one substituent selected from the group consisting of the amino, cyano, hydroxyl, alkoxy and aryloxy groups and a has a value of at least 2, which process comprises reacting (1) a completely condensed linear diorganopolysiloxane containing at least seven groups represented by the formula:

$$-\underset{R}{\overset{R}{Si}}O-$$

wherein R has the above-defined meaning and (2) water in the presence of ammonia at a temperature from 100°

C. to 150° C. and at a pressure above atmospheric pressure in a closed vessel, said process being conducted in the absence of any nitrile solvent.

4. The process of claim 3 wherein each R is a methyl group.

5. A process for producing diorganosiloxanes represented by the formula:

$$\text{HO}(\underset{\underset{\text{Me}}{|}}{\overset{\overset{\text{Me}}{|}}{\text{Si}}}\text{O})_b\text{H}$$

wherein $b$ has a value from 2 to 250 inclusive which process comprises reacting (1) a cyclic diorganopolysiloxane represented by the formula:

$$(\underset{\underset{\text{Me}}{|}}{\overset{\overset{\text{Me}}{|}}{\text{Si}}}\text{O})_g$$

wherein $g$ has a value from 3 to 5 inclusive and (2) water, said water being present in an amount from 1 to 10 times the stoichiometric amount required to react with the cyclic diorganopolysiloxane, in the presence of ammonia, said ammonia being present in amount of from 2 to 5 moles of ammonia per mole of the cyclic diorganopolysiloxane, at a temperature from 100° C. to 150° C. and at a pressure from 400 to 1000 pounds per square inch gage in a closed vessel, said process being conducted in the absence of any nitrile solvent.

6. A process for producing diorganosiloxanes represented by the formula:

$$\text{HO}(\underset{\underset{(\text{CH}_2)_e\text{NH}_2}{|}}{\overset{\overset{\text{Me}}{|}}{\text{Si}}}\text{O})_h\text{H}$$

wherein $h$ has a value from 2 to 250 inclusive and $e$ has a value of at least 3 which process comprises reacting (1) a cyclic diorganopolysiloxane represented by the formula:

$$(\underset{\underset{(\text{CH}_2)_e\text{NH}_2}{|}}{\overset{\overset{\text{Me}}{|}}{\text{Si}}}\text{O})_g$$

wherein $g$ has a value from 3 to 5 and $e$ has a value of at least three and (2) water, said water being present in an amount from 1 to 10 times the stoichiometric amount required to react with the cyclic diorganopolysiloxane, in the presence of ammonia, said ammonia being present in amount of from 2 to 5 moles of ammonia per mole of the cyclic diorganopolysiloxane, at a temperature from 100° C. to 150° C. and at a pressure from 400 to 1000 pounds per square inch gage in a closed vessel, said process being conducted in the absence of any nitrile solvent.

7. A process for producing diorganosiloxanes represented by the formula:

$$\underset{\underset{(\text{CH}_2)_m\text{CN}}{|}}{\overset{\overset{\text{Me}}{|}}{\text{Si}}}\text{O})_b\text{H}$$

wherein $b$ has a value from 2 to 250 inclusive and $m$ has a value of at least 2 which process comprises reacting (1) a cyclic diorganopolysiloxane represented by the formula:

$$(\underset{\underset{(\text{CH}_2)_m\text{CN}}{|}}{\overset{\overset{\text{Me}}{|}}{\text{Si}}}\text{O})_g$$

wherein $g$ has a value from 3 to 5 and $m$ has a value of at least 2 and (2) water, said water being present in an amount from 1 to 10 times the stoichiometric amount required to react with the cyclic diorganopolysiloxane, in the presence of ammonia, said ammonia being present in amounts of from 2 to 5 moles of ammonia per mole of the cyclic diorganopolysiloxane, at a temperature from 100° C. to 150° C. and at a pressure from 400 to 1000 pounds per square inch gage in a closed vessel, said process being conducted in the absence of any nitrile solvent.

8. A process for producing diorganosiloxanes represented by the formula:

$$\text{HO}(\underset{\underset{\text{Me}}{|}}{\overset{\overset{\text{Vi}}{|}}{\text{Si}}}\text{O})_h\text{H}$$

wherein $h$ has a value from 2 to 250 inclusive which process comprises reacting (1) a cyclic diorganopolysiloxane represented by the formula:

$$(\underset{\underset{\text{Me}}{|}}{\overset{\overset{\text{Vi}}{|}}{\text{Si}}}\text{O})_g$$

wherein $g$ has a value from 3 to 5 and (2) water, said water being present in an amount from 1 to 10 times the stoichiometric amount required to react with the cyclic diorganopolysiloxane, in the presence of ammonia, said ammonia being present in amount of from 2 to 5 moles of ammonia per mole of the cyclic diorganopolysiloxane, at a temperature from 100° C. to 150° C. and at a pressure from 400 to 1000 pounds per square inch gage in a closed vessel, said process being conducted in the absence of any nitrile solvent.

References Cited in the file of this patent

UNITED STATES PATENTS

| | | |
|---|---|---|
| 2,843,555 | Berridge | July 15, 1958 |
| 2,863,897 | Wehrly | Dec. 9, 1958 |
| 2,907,782 | Pike | Oct. 6, 1959 |